(12) United States Patent
Nishimura et al.

(10) Patent No.: US 8,922,623 B2
(45) Date of Patent: Dec. 30, 2014

(54) STEREO IMAGE PROCESSOR AND STEREO IMAGE PROCESSING METHOD

(75) Inventors: Hirofumi Nishimura, Kanagawa (JP); Takuya Nanri, Kanagawa (JP); Kensuke Maruya, Osaka (JP)

(73) Assignee: Panasonic Corporation, Osaka (JP)

( * ) Notice: Subject to any disclaimer, the term of this patent is extended or adjusted under 35 U.S.C. 154(b) by 761 days.

(21) Appl. No.: 13/258,987

(22) PCT Filed: Mar. 5, 2010

(86) PCT No.: PCT/JP2010/001537
§ 371 (c)(1),
(2), (4) Date: Sep. 22, 2011

(87) PCT Pub. No.: WO2010/113389
PCT Pub. Date: Oct. 7, 2010

(65) Prior Publication Data
US 2012/0026295 A1  Feb. 2, 2012

(30) Foreign Application Priority Data
Mar. 31, 2009  (JP) .................................. 2009-086687

(51) Int. Cl.
*H04N 13/02* (2006.01)
*G01B 11/26* (2006.01)
*G01C 11/06* (2006.01)
*G06T 7/00* (2006.01)

(52) U.S. Cl.
CPC ............... *G01B 11/26* (2013.01); *G01C 11/06* (2013.01); *G06T 7/0026* (2013.01); *G06T 2207/10012* (2013.01)
USPC ........................................................ 348/46

(58) Field of Classification Search
CPC .................. G01B 11/26; G01C 11/06; G06T 2207/10012; G06T 7/0026
USPC .............................................. 348/E13.074, 46
See application file for complete search history.

(56) References Cited

U.S. PATENT DOCUMENTS

2008/0123938 A1* 5/2008 Kim .............................. 382/154

FOREIGN PATENT DOCUMENTS

| JP | 2008-89402 | 4/2008 |
| JP | 2008-99828 | 5/2008 |
| JP | 2008-123141 | 5/2008 |

OTHER PUBLICATIONS

Takuma Shibahara et al., "A High-Accuracy Sub-Pixel Correspondence Technique Using ID Phase-Only Correlation", The IEICE Transactions on Information and Systems, Sep. 1, 2008, pp. 2343-2356 and partial English translation.
International Preliminary Report on Patentability issued Nov. 24, 2011 in International (PCT) Application No. PCT/JP2010/001537.
International Search Report issued Apr. 13, 2010 in International (PCT) Application No. PCT/JP2010/001537.

* cited by examiner

*Primary Examiner* — Sath V Perungavoor
*Assistant Examiner* — Dakshesh Parikh
(74) *Attorney, Agent, or Firm* — Wenderoth, Lind & Ponack, L.L.P.

(57) ABSTRACT

A stereo image processor (1) performs image matching, in an image matching section (6), on partial images of the same object included in a base image and a comparative image respectively and detects pixel-precision partial displacement between the base image and the comparative image based on a result of the image matching. Next, in an inverted phase filter processing section (9) in a second matching section (8), pixel values from the comparative image are filtered with an inverted phase filter using, as a filter coefficient, pixel values from the base image with the order thereof reversed, given the partial images of the same object that have minimum pixel-precision partial displacement. Then, in a peak detecting section (10), a peak position where an output value of the filtering with the inverted phase filter is maximum is detected and sub-pixel-precision partial displacement between the base image and the comparative image is detected based on the peak position. In this way, there is provided a stereo image processor that has improved accuracy of disparity calculation and analytical resolution and that requires less computation for disparity calculation and is capable of fast processing.

10 Claims, 13 Drawing Sheets

$$f'(m) = f(xa+m, ya) \times \frac{1}{2}\left\{\cos(\pi\frac{m}{K-J})+1\right\}$$

$$g'(m) = g(xa+n+m, ya) \times \frac{1}{2}\left\{\cos(\pi\frac{m}{K-J})+1\right\}$$

where $J \leq m \leq K$ $$z(m) = \sum_{k=J}^{K} f'(-k) \times g'(m-k)$$

$$f(t) = \sum_{n=-\infty}^{\infty} f(nT) \frac{\sin\left(\pi\left(\dfrac{t}{T}-n\right)\right)}{\pi\left(\dfrac{t}{T}-n\right)}$$

$$\delta = \frac{z(-1) - z(+1)}{2 \times \{z(-1) + z(+1) - 2 \times z(0)\}}$$

$$f'(m) = f(xa+m, ya) \times \frac{1}{2}\left\{\cos(\pi \frac{m}{K-J})+1\right\}$$

$$g'(m) = g(xa+n+m, ya) \times \frac{1}{2}\left\{\cos(\pi \frac{m}{K-J})+1\right\}$$

where $\quad J \leq m \leq K$ $$CC(n) = \sum_{j=ya-wv/2}^{ya+wv/2} \sum_{i=xa-wh/2}^{xa+wh/2} \{f'(x+i, y+j) \times g'(x+i+n, y+j)\}$$

Distance to object to be measured

Fig. 12

|  | Computational Time[ms] |
|---|---|
| SAD method | 1 6 |
| 1D POC method | 7 4 8 |
| the outstanding method | 2 0 |

STEREO IMAGE PROCESSOR AND STEREO IMAGE PROCESSING METHOD

TECHNICAL FIELD

The present invention relates to a stereo image processor that calculates partial displacement between images caused by disparity based on stereo images (a base image and a comparative image) obtained by taking images of the same object.

BACKGROUND ART

Conventionally, a stereo image processor is known, which calculates partial displacement between images based on two images (a base image and a comparative image) obtained when a stereo camera is used to take images of the same object, and measures a distance to the object based on the partial displacement between the images. The stereo image processor is under study for application to devices such as one that measures a distance to a vehicle in front based on images obtained by using an on-board camera to take the images of the vehicle or one that measures a distance to a part of the driver's face, such as an eye and a nose, based on images obtained by using an inboard camera to take the images of the face and estimates the direction of the driver's face. However, the smaller size of recent cameras, such as on-board and inboard cameras, have led to a smaller camera spacing and resultant smaller partial displacement between stereo images. Consequently, there is a need for highly accurate disparity calculating functions for a stereo image processor.

Conventionally, a stereo matching method (which is for disparity calculation for stereo image processing) such as a sum of absolute difference (SAD) method and a phase only correlation method (POC) is used in such a stereo image processor.

In a SAD method, partial images are cut off from a base image and a comparative image respectively by using a rectangular window, and the total sum of absolute values of difference between luminance values of the partial images is calculated. Characteristics values here, such as a SAD value, indicate a level of difference in luminance of images. The position of the rectangular window of the comparative image is then shifted on a per pixel basis in the baseline direction to find a alignment at which the SAD value is minimized, which is defined as "pixel level disparity (i.e. partial displacement)". Thereafter, three SAD values around the minimum value (i.e. the minimum, the second minimum, and the third minimum of SAD values) are used to calculate "sub-pixel level disparity (i.e. partial displacement)" by isometric linear fitting.

Such a SAD method has traditionally been used and characterized by relatively high analytical resolution with less computation. However, the SAD method suffers from low accuracy of sub-pixel level disparity calculation; the SAD method can determine disparity (i.e. partial displacement between images) only on the order of ¼ to ¹⁄₁₆ pixel accuracy and is difficult to satisfy the need for highly accurate disparity calculating functions.

Recently, therefore, the POC method draws attention for its high accuracy in disparity calculation. In the POC method, partial images are cut off from a base image and a comparative image respectively by using a window function for reducing an effect from harmonics occurring when a Hanning window or the like is used to cut off an image, and a 2D Fourier transformation is performed on the partial images. The 2 pieces of Fourier image data are combined and the amplitude component is normalized. A 2D inverse Fourier transformation is then performed on the data to determine a phase-limited correlation coefficient. The amount of partial displacement between images is then determined based on a correlated peak.

Such a POC method, which is referred to as a 2D POC method, has an advantage of very high accuracy in disparity calculation. However, the 2D POC method requires a large amount of computation in disparity calculation, and it is difficult to compute in a short time. In addition, the 2D POC method is inferior to the SAD method in terms of analytical resolution, which is the quantity on a screen at which isolated objects can be distinguished and the distance can be measured.

Recently, a 1D POC method is proposed (see Patent Literature 1), which requires less computation than the 2D POC method. In the 1D POC method, partial images are cut off from a base image and a comparative image respectively by using a Hanning window, and a 1D Fourier transformation is performed on the partial images. The 2 pieces of Fourier image data are combined and the amplitude component is normalized. A 1D inverse Fourier transformation is then performed on the data to determine a phase-limited correlation coefficient. In other words, the 1D Fourier transformation is performed instead of the 2D Fourier transformation to reduce computation.

However, even though computation has been somewhat reduced in the conventional 1D POC method, the reduction is still insufficient and computation required to calculate disparity is still much greater (in comparison with the SAD method); therefore, it is not easy to compute in a short time. In addition, the 1D POC method is significantly inferior to the SAD method in terms of analytical resolution, which is the quantity on a screen at which isolated objects can be distinguished and the distance can be measured.

CITATION LIST

Patent Literature

Patent Literature 1: Japanese Patent Laid-Open No. 2008-123141

SUMMARY OF INVENTION

Technical Problem

The present invention has been made under such circumstances. It is an object of the invention to provide a stereo image processor that has improved accuracy of disparity calculation and analytical resolution and that requires less computation for disparity calculation and is capable of fast processing.

Solution to Problem

One aspect of the invention is a stereo image processor. The device is a stereo image processor that calculates partial displacement between images caused by disparity based on a base image and a comparative image obtained by taking images of the same object, the processor comprising: an image matching section for performing image matching on partial images of the same object included in a base image and a comparative image respectively and detecting pixel-precision partial displacement between the base image and the comparative image based on a result of the image matching; an inverted phase filter processing section for filtering pixel values from the comparative image with an inverted phase filter using, as a filter coefficient, pixel values from the base image with the order thereof reversed, given the partial images of the same object that have minimum pixel-precision partial displacement; and a peak position detecting section for detecting a peak position where an output value of the filtering with the inverted phase filter is maximum and detecting sub-pixel-precision partial displacement between the base image and the comparative image based on the peak position.

A further aspect of the invention is a stereo image processor. The device is a stereo image processor that calculates partial displacement between images caused by disparity based on a base image and a comparative image obtained by taking images of the same object, the processor comprising: an image matching section for performing image matching on partial images of the same object included in a base image and a comparative image respectively and detecting pixel-precision partial displacement between the base image and the comparative image based on a result of the image matching; a cross-correlation calculating section for calculating a cross-correlation value between the base image and the comparative image for partial images of the same object that have minimum pixel-precision partial displacement; and a peak position detecting section for detecting a peak position where the cross-correlation value is maximum and detecting sub-pixel-precision partial displacement between the base image and the comparative image based on the peak position.

A still further aspect of the invention is a stereo image processor. The device is a stereo image processor that calculates partial displacement between images caused by disparity based on a base image f(x,y) and a comparative image g(x,y) obtained by taking images of the same object, the processor comprising: an image matching section for performing image matching on partial images f(x,y) and g(x,y) (where, xa−wh/2≤x≤xa+wh/2, ya−wv/2≤y≤ya+wv/2) of the same object included in a base image and a comparative image respectively and detecting pixel-precision partial displacement n between the base image and the comparative image in the direction x, which is the baseline direction, based on a result of the image matching; a calculation section for calculating the following expression on 1D partial images f′(m)=f(xa+m,ya)×w(m) and g′(m)=g(xa+n+m,ya) (where, J≤m≤K) cut off by using a window function w(m) at a position where the pixel-precision partial displacement n is minimum:

[Expression 3]

$$z(m) = \sum_{k=J}^{K} f'(-k) \times g'(m-k); \quad (3)$$

and a peak position detecting section for detecting a peak position where an output value z(m) of the calculation is maximum and detecting sub-pixel-precision partial displacement δ between the base image and the comparative image based on the peak position.

A still further aspect of the invention is a stereo image processing method. The method is a stereo image processing method for calculating partial displacement between images caused by disparity based on a base image and a comparative image obtained by taking images of the same object, the method comprising: performing image matching on partial images of the same object included in a base image and a comparative image respectively and detecting pixel-precision partial displacement between the base image and the comparative image based on a result of the image matching; filtering pixel values from the comparative image with an inverted phase filter using, as a filter coefficient, pixel values from the base image with the order thereof reversed, given the partial images of the same object that have minimum pixel-precision partial displacement; and detecting a peak position where an output value of the filtering with the inverted phase filter is maximum and detecting sub-pixel-precision partial displacement between the base image and the comparative image based on the peak position.

As described below, the present invention has other aspects. Therefore, the disclosure of the invention is intended to provide some of the aspects of the invention, and is not intended to limit the scope of the invention as described and claimed herein.

BRIEF DESCRIPTION OF DRAWINGS

FIG. 12 shows a comparison result of computational time.

DESCRIPTION OF EMBODIMENTS

Figure 1:
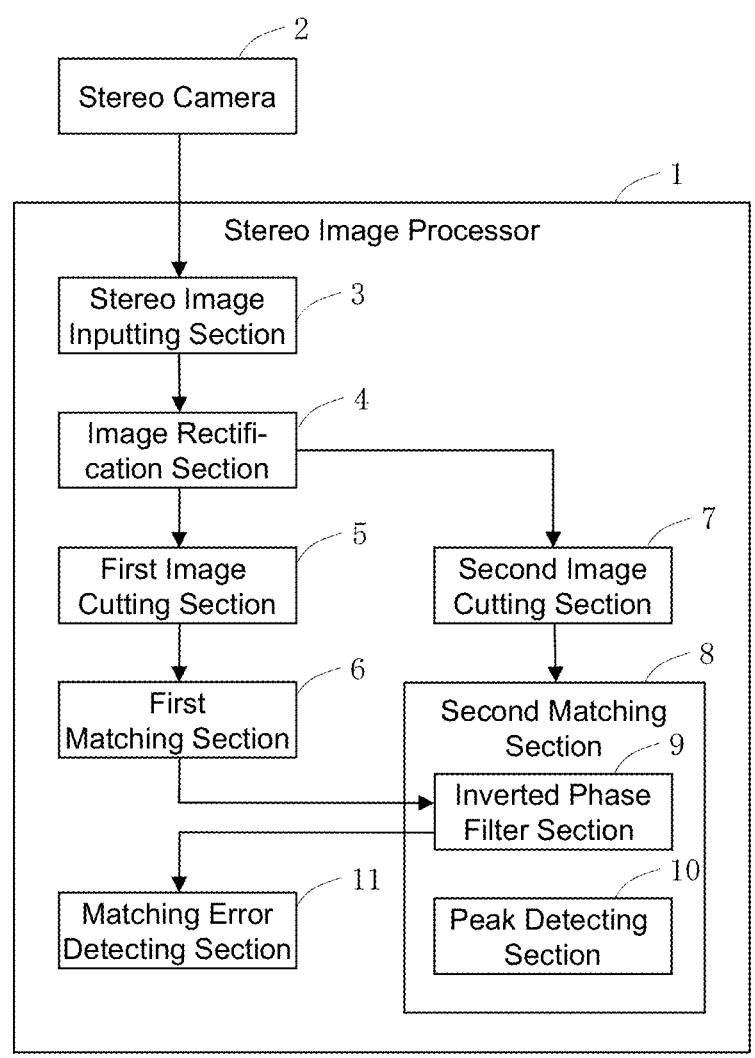
FIG. 1 is a block diagram showing a configuration of a stereo image processor according to an embodiment.

The present invention will now be described in detail. However, the detailed description below and attached drawings are not intended to limit the present invention.

A stereo image processor according to the present invention is a stereo image processor that calculates partial displacement between images caused by disparity based on a base image and a comparative image obtained by taking images of the same object, the processor comprising: an image matching section for performing image matching on partial images of the same object included in a base image and a comparative image respectively and detecting pixel-precision partial displacement between the base image and the comparative image based on a result of the image matching; an inverted phase filter processing section for filtering pixel values from the comparative image with an inverted phase filter using, as a filter coefficient, pixel values from the base image with the order thereof reversed, given the partial images of the same object that have minimum pixel-precision partial displacement; and a peak position detecting section for detecting a peak position where an output value of the filtering with the inverted phase filter is maximum and detecting sub-pixel-precision partial displacement between the base image and the comparative image based on the peak position.

With this configuration, pixel-precision partial displacement between the base image and the comparative image is detected by image matching, and given the partial images that have minimum pixel-precision partial displacement, filtering is performed with an inverted phase filter. A peak position is detected based on the result of the filtering and sub-pixel-precision partial displacement between the base image and the comparative image is calculated. The accuracy of disparity calculation and analytical resolution can therefore be improved. In this case, the image matching for detecting pixel-precision partial displacement requires less computation, and the filtering using an inverted phase filtering also requires less computation because partial images that have minimum pixel-precision partial displacement may only be used to perform the filtering. Therefore, fast disparity calculation may be possible.

According to the present invention, an inverted phase filter processing section is provided, which performs filtering with an inverted phase filter given the partial images of the same object that have minimum pixel-precision partial displacement. The accuracy of disparity calculation and analytical resolution can therefore be improved, and fast processing is possible because less computation is required in the disparity calculation.

Embodiment 1

A stereo image processor according to embodiments of the present invention will now be described below with reference to drawings. In this embodiment, description will be made as an example to a stereo image processor for use in devices such as one that measures a distance to a vehicle in front by using an on-board camera or one that estimates the direction of the driver's face by using an inboard camera.

A configuration of a stereo image processor according to the embodiment will now be described below with reference to drawings. FIG. 1 is a block diagram of a configuration of a stereo image processor according to the embodiment. As shown in FIG. 1, a stereo image processor 1 comprises a stereo image inputting section 3 that receives, as an input, stereo images (a base image and a comparative image) taken by a stereo camera 2, and an image rectification section 4 for correcting lens distortion and arranging optical axes in parallel in stereo images (a base image and a comparative image) as preprocessing. Specifically, the image rectification section 4 uses calibration data to generate a camera image that reflects a straight object as straight as that in the real space. The image rectification section 4 also performs coordinate transformation for generating a camera image that reflects an object located at a certain distance in the direction of a camera optical axis always in the same size wherever the object is taken in the camera image, and arranges camera optical axes in parallel and shifts images so that an object at the point at infinity can be located at the same position in two camera images. Although description has been made here as an example by way of a method of using image shifting after coordinate transformation to accomplish image rectification, the scope of the invention is not limited thereto and any approach may be used to perform such correction, such as by using coordinate transformation to arrange optical axes in parallel at the same time as the lens distortion correction, as long as the lens distortion can be corrected and the positional relationship between two cameras can be corrected.

Although description has been made to the case where only the image rectification is performed as preprocessing, it is not intended to limit the type of preprocessing, such as contrast correction used in typical image processing and edge enhancement using a Laplacian filter, and such preprocessing may be omitted.

Accordingly, the contrast correction can, if implemented, match the dynamic range of luminance variation between the base image and the comparative image, so that more accurate image matching may be possible. Similarly, the edge enhancement using a Laplacian filter can, if implemented, remove DC components caused by the individual difference between cameras, that is, the difference in brightness between the base image and the comparative image, so that more accurate image matching may be possible.

In coordinate transformation and shifting of images, luminance information at a position of a certain integer sampled on a per pixel basis is typically converted to further luminance information at a position of a real number. To accomplish this conversion, the interlinear method using linear interpolation, the bicubic method that uses luminance information around a position to be converted, or the like may be used. Although the interlinear method and the bicubic method have been cited as an approach for coordinate transformation, the scope of the invention is not limited thereto and any approach may be used for such conversion as long as it can be used for coordinate transformation.

Figure 2:
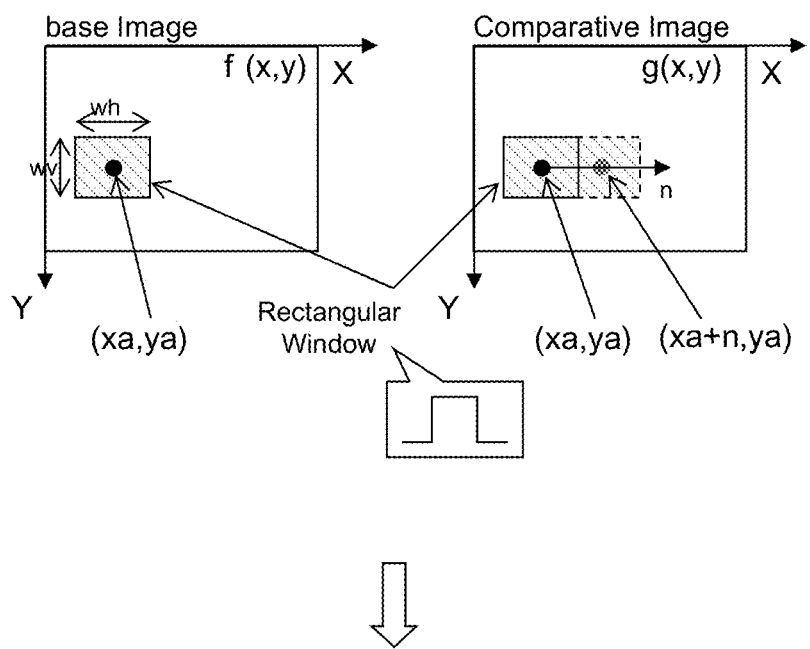
FIG. 2 is a diagram for illustrating pixel level matching.

The stereo image processor 1 comprises a first image cutting section 5 and a first matching section 6 as mechanisms for pixel level matching. FIG. 2 is a diagram for illustrating an example of the pixel level matching. The first image cutting section 5 uses a rectangular window to cut off data from each of the base image and the comparative image. FIG. 2 shows how a rectangular window of a predetermined window size (vertical size: wv pixels; and horizontal size: wh pixels) is used to cut off data from the base image and the comparative image. In this case, a rectangular window centered at a predetermined position (xa,ya) is used to cut off data from the base image, as shown in FIG. 2. From the comparative image, on the other hand, the position (xa,ya) of the rectangular window is shifted on a per pixel basis in the horizontal direction (x direction) while data is cut off. The first matching section 6 calculates a SAD value of the data cut off from the base image and the comparative image and determines partial displacement n between the images at which the SAD value is minimized based on the following expression (1):

[Expression 1]

$$SAD(n) = \sum_{j=ya-wv/2}^{ya+wv/2} \sum_{i=xa-wh/2}^{xa+wh/2} |f(x+i, y+j) - g(x+i+n, y+j)| \quad (1)$$

In this way, the first matching section 6 has functions of performing image matching on partial images (the base image and the comparative image) cut off from the base image and the comparative image, and detecting pixel-precision partial displacement between the base image and the comparative image based on the result of the image matching. The first matching section 6 corresponds to "image matching means" of the invention.

Although description has been made here as an example to the case where the SAD method is used for pixel level matching, the scope of the invention is not limited thereto and any other methods, such as the Sum of Squared Differences (SSD) method, may be used for pixel level matching as long as they require less computation.

Figure 3:
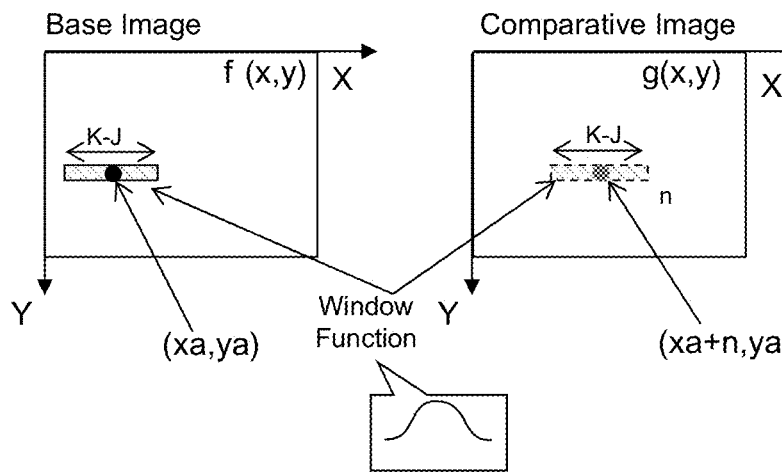
FIG. 3 is a diagram for illustrating sub-pixel level matching.
Figure 3:

The stereo image processor 1 also comprises a second image cutting section 7 and a second matching section 8 as mechanisms for sub-pixel level matching. FIG. 3 is a diagram for illustrating an example of the sub-pixel level matching. The second image cutting section 7 uses a window function to cut off data from each of the base image and the comparative image. FIG. 3 shows how a window function w(m) of a Hanning window such as the expression (2) below is used to cut off data from the base image and the comparative image. In this case, a Hanning window centered at a predetermined position (xa,ya) is used to cut off data from the base image, and a Hanning window centered at a position (xa+n,ya) matched in the pixel level matching as described above is used to cut off data from the comparative image, as shown in FIG. 3. Although omitted in FIG. 1, the information "n" associated with the position (xa+n,ya) matched in the pixel level matching is transmitted from the first matching section 6 to the second image cutting section 7.

[Expression 2]

$$w(m) = \frac{1}{2}\left\{\cos\left(\pi\frac{m}{K-J}\right) + 1\right\} \quad (2)$$

Although description has been made here as an example to the case of the window size of "vertical size: 1 pixel; and horizontal size: K-J pixels", the scope of the invention is not limited thereto. Further, although description has been made to the case of a window function of a Hanning window, any other window functions may be used.

The second matching section 8 comprises an inverted phase filter section 9 for filtering a partial image at a position matched in the pixel level matching with an inverted phase filter, and a peak detecting section 10 for detecting a peak position from an output value from the inverted phase filter section 9.

Figure 4:
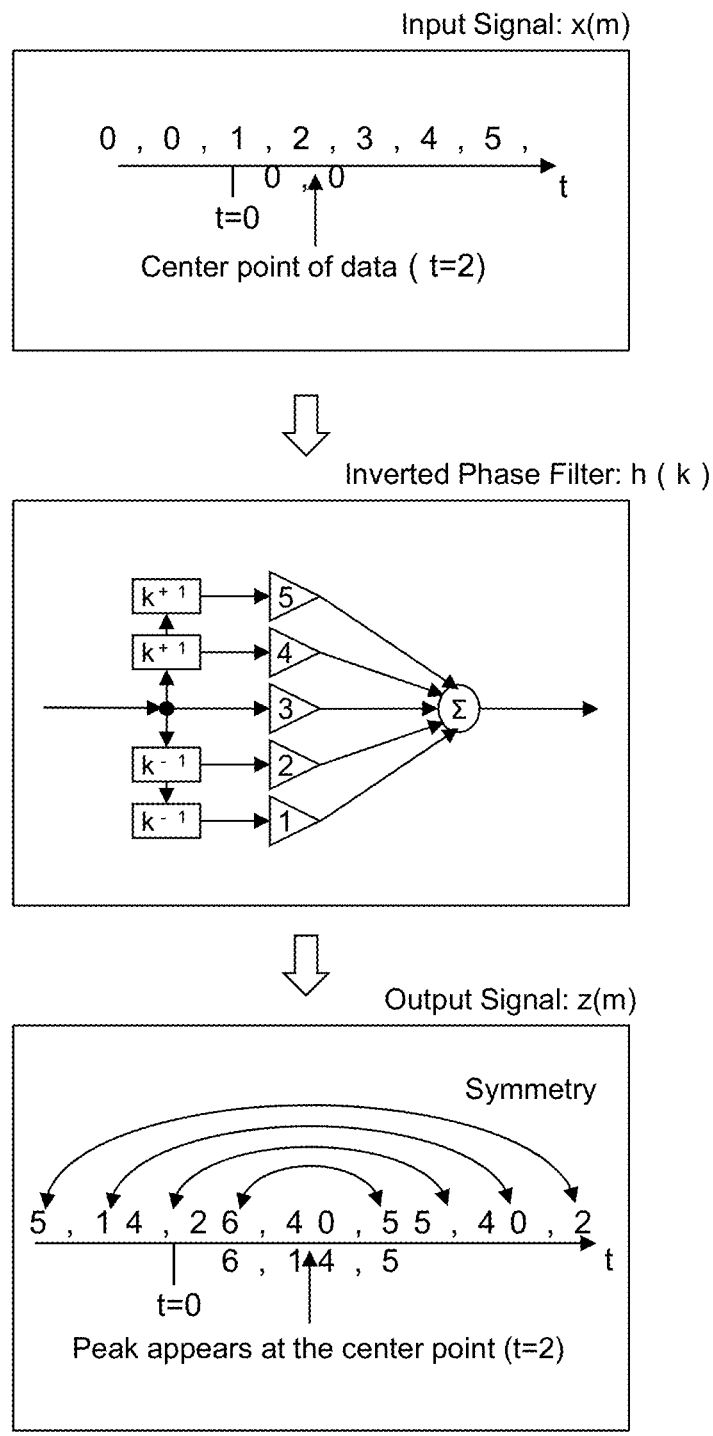
FIG. 4 is a diagram for illustrating a process of filtering with an inverted phase filter.

Description will now be made in detail to processing performed in the inverted phase filter section 9 with reference to drawings. FIG. 4 is a diagram for illustrating an example of the filtering with the inverted phase filter. The example in FIG. 4 shows the case where an input signal x(m) representing "0, 0, 1, 2, 3, 4, 5, 0, 0" is input to the inverted phase filter. In this case, the tap length of the inverted phase filter h(k) (a length K-J of the window function w(m) used to cut off a partial image in the second image cutting section 7) is set to "5", and a set of values "5, 4, 3, 2, 1" obtained by the 5 pieces of data (luminance values of the base image) with the order thereof reversed is used as a filter coefficient. Given the position k as the center of the input signal, then, 5 pieces of data around k, i.e. k−2, k−1, k, k+1, k+2, are filtered with the inverted phase filter, which calculates the total sum as an output signal z(m). In this inverted phase filter section 9, the tap length of the inverted phase filter is set depending on the magnitude of partial displacement n (pixel-precision partial displacement) detected in the pixel level matching. For example, if the pixel-precision partial displacement n is smaller, the tap length of the inverted phase filter also becomes smaller accordingly.

Specifically, referring to FIG. 4, when t=0 for example, 5 pieces of data around t=0, i.e. 0, 0, 1, 2, 3, are filtered with the inverted phase filter "5, 4, 3, 2, 1" and an output value "26" (=0×1+0×2+1×3+2×4+3×5) is calculated. The character "t" as used here denotes a coordinate point in the partial image cut off from the comparative image by the Hanning window, as shown in FIG. 4. When t=1, then 5 pieces of data around t=1, i.e. 0, 1, 2, 3, 4, are filtered with the inverted phase filter "5, 4, 3, 2, 1" and an output value "40" (=0×1+1×2+2×3+3×4+4×5) is calculated. Similarly, when t=2, t=3, and t=4, output values "55", "40", and "26" are calculated, respectively. In this way, filtering with the inverted phase filter is characterized by its output signal that is symmetrical (in FIG. 4, bilateral symmetry with respect to t=2) and has a peak in the center. In addition, the inverted phase filter is a type of so-called FIR filter, and is, therefore, characterized by being a linear shift-invariant system, in which an input signal with any shift leads to an output signal with the same amount of shift as the input signal. This means that even when an input has a shift interval smaller than a sampling interval, an output will have the same amount of shift as the input and the output will have a value taken at a sampling point in the shifted signal.

In the inverted phase filter section 9, a value f'(−k) obtained by luminance values of the base image with the order thereof reversed is used as a filter coefficient for the inverted phase filter, and a luminance value g'(m) of the comparative image is an input signal x(m). Therefore, it follows that an output signal z(m) obtained at the inverted phase filter section 9 can be calculated by the following expression (3):

[Expression 3]

$$z(m) = \sum_{k=J}^{K} f'(-k) \times g'(m-k) \quad (3)$$

As described above, the inverted phase filter section 9 is configured to filter luminance values (pixel values) from the comparative image with an inverted phase filter using, as a filter coefficient, luminance values (pixel values) from the base image with the order thereof reversed, given partial images at positions matched in the pixel level matching (the partial images of the same object that have minimum pixel-precision partial displacement). The inverted phase filter section 9, therefore, corresponds to "inverted phase filter means" of the invention.

Since the output of the inverted phase filter is a linear shift-invariant system output, the output may theoretically reflect a true shift, excepting an error in the lens distortion correction, an error such as a gain noise caused by an image sensor such as CCD, and an error in computational accuracy for cutting off an image by using a window. Therefore, it is possible to determine a true peak position at a sub-pixel level by interpolating numerical values between pixels for inverted phase filter outputs discretely separated on a per pixel basis according to a sampling theorem.

Description will now be made in detail to processing performed in the peak detecting section 10 with reference to drawings. The peak detecting section 10 uses a sinc function to detect a peak position at which an output value from the inverted phase filter section 9 is maximized at a sub-pixel level.

The sinc function is a function defined by sin(πx)/πx, and is used to restore discrete sampling data to an original continuous data. It has been demonstrated in the sampling theorem that convolution between sampled discrete data and the sinc function can completely restore the original continuous data. Therefore, it is theoretically possible to derive a true peak position even at a sub-pixel level by interpolating data between pixels for discrete inverted phase filter outputs using the sinc function to determine the peak position.

Figure 5:
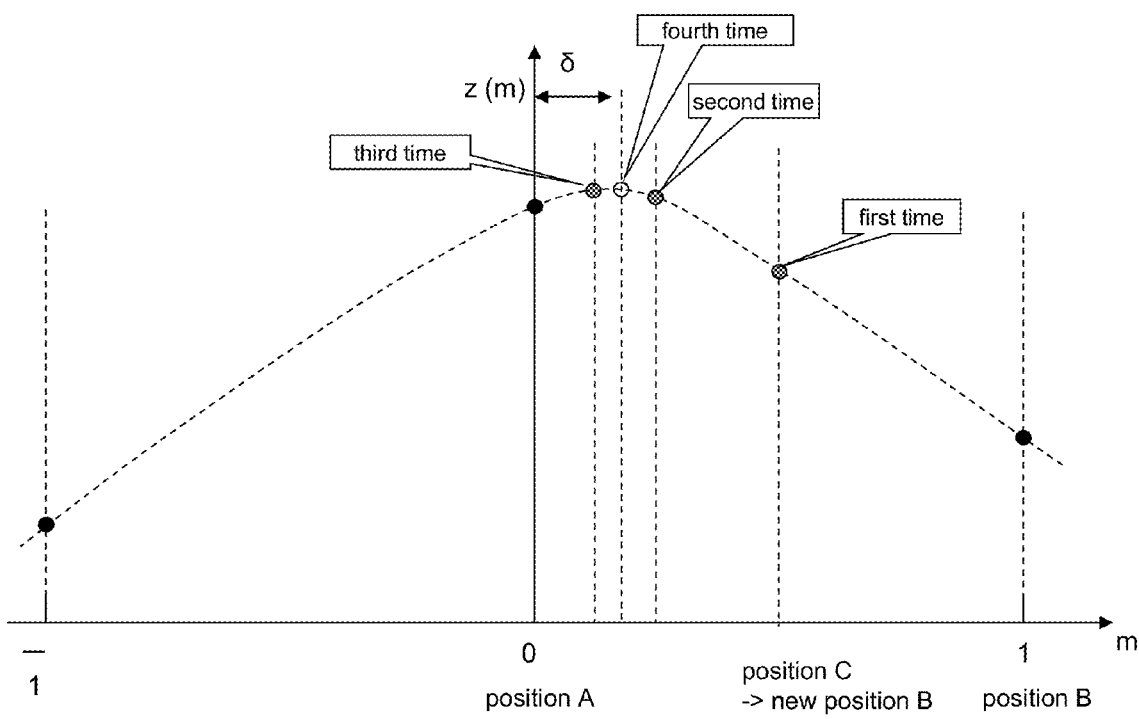
FIG. 5 is a graphical representation for illustrating a process of detecting a peak position using a sinc function.

FIG. 5 is a diagram for illustrating an example of detecting a peak position using a sinc function. As shown in FIG. 5, when the sinc function is used to detect a peak position, the binary search is used to detect the peak position.

For example, a position A is defined first, which is a position m=0 where an output value z(m) from the inverted phase filter section 9 is maximum. Next, comparison is made between output values z(+1) and z(-1) of positions shifted by one pixel from the maximum position A to right and left, respectively, and a position m=1, whichever larger, is defined as B. A intermediate position between the positions A and B is then defined as C, and the expression (4) below that uses the sinc function is used to calculate the value of the position C according to the sampling theorem. The position C is then treated as a new position B, and the above process is repeated as dictated by a required accuracy to find a peak position δ at which the largest value is provided. Specifically, the above process may be performed only once if the required sub-pixel accuracy is ½ pixels, and the number of repetition may be determined depending on the required sub-pixel accuracy, such as two times for a ¼-pixel accuracy and three times for a ⅛-pixel accuracy.

[Expression 4]

$$f(t) = \sum_{n=-\infty}^{\infty} f(nT) \frac{\sin\left(\pi\left(\frac{t}{T} - n\right)\right)}{\pi\left(\frac{t}{T} - n\right)} \quad (4)$$

Although description has been made to an approach that uses the binary search as an example of an approach for deriving a peak position using the sinc function, other approaches such as gradient method may be used to search the peak position; thus the scope of the invention is not limited thereto and any other method may be used as long as the sinc function is used to detect a peak position by interpolating values between pixels.

Furthermore, the peak detecting section 10 may use quadratic curve approximation to detect a peak position where an output value from the inverted phase filter section 9 is maximum so as to reduce computation. Peak position extraction using quadratic curve approximation is a method in which, when a peak position of discrete 1D data is to be determined with an accuracy below the discrete interval, a quadratic curve is fitted and the peak position is calculated based on the position of the maximum value with an accuracy smaller than the discrete interval.

Figure 6:
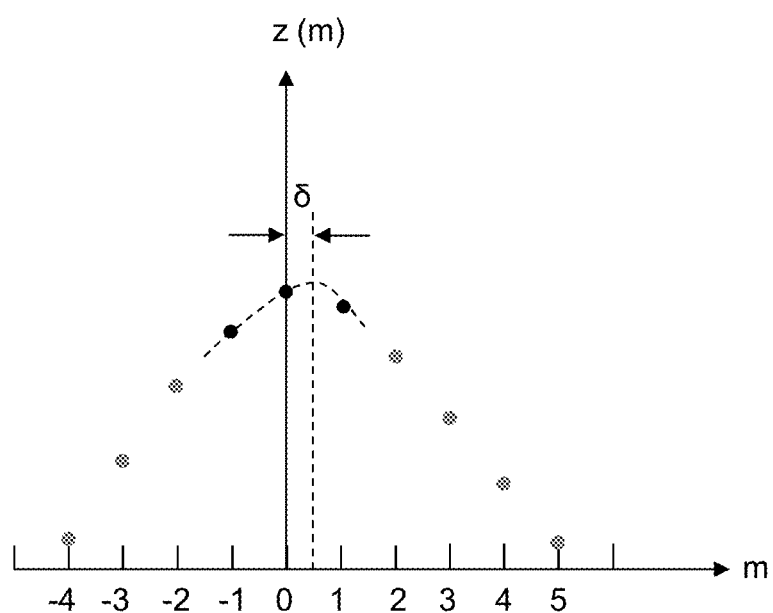
FIG. 6 is a graphical representation for illustrating a process of detecting a peak position using a quadratic curve approximation.

FIG. 6 is a diagram for illustrating an example of detecting a peak position using quadratic curve approximation. In this case, as shown in FIG. 6, the maximum value of a quadratic curve passing through the following three points is defined as δ: the maximum value of an output value from the inverted phase filter section 9 and output values z(+1) and z(-1) on the right and left of the maximum value. In this case, the peak position δ is calculated by the following expression (5):

[Expression 5]

$$\delta = \frac{z(-1) - z(+1)}{2 \times \{z(-1) + z(+1) - 2 \times z(0)\}} \quad (5)$$

As described above, the peak detecting section 10 has a function of detecting a peak position where an output value of the filtering with the inverted phase filter is maximum and detecting sub-pixel-precision partial displacement between the base image and the comparative image based on the peak position. The peak detecting section 10, therefore, corresponds to "peak position detecting means" of the invention.

The stereo image processor 1 also comprises a matching error detecting section 11 for detecting a matching error in pixel level image matching based on the result of filtering with the inverted phase filter. For example, when an output from the inverted phase filter section 9 is not symmetrical (bilateral symmetry), the matching error detecting section 11 determines that the pixel level matching has been erroneous matching. Alternatively, when the minimum position of an SAD value and a peak position of an output of the inverted phase filter section 9 is different from each other at a pixel level, such as when no peak appears in the output of the inverted phase filter section 9, the matching error detecting section 11 determines that there is a matching error. This eliminates the need of back matching and computation can be reduced accordingly.

The operation of a thus configured stereo image processor 1 will be described with reference to drawings.

Figure 7:
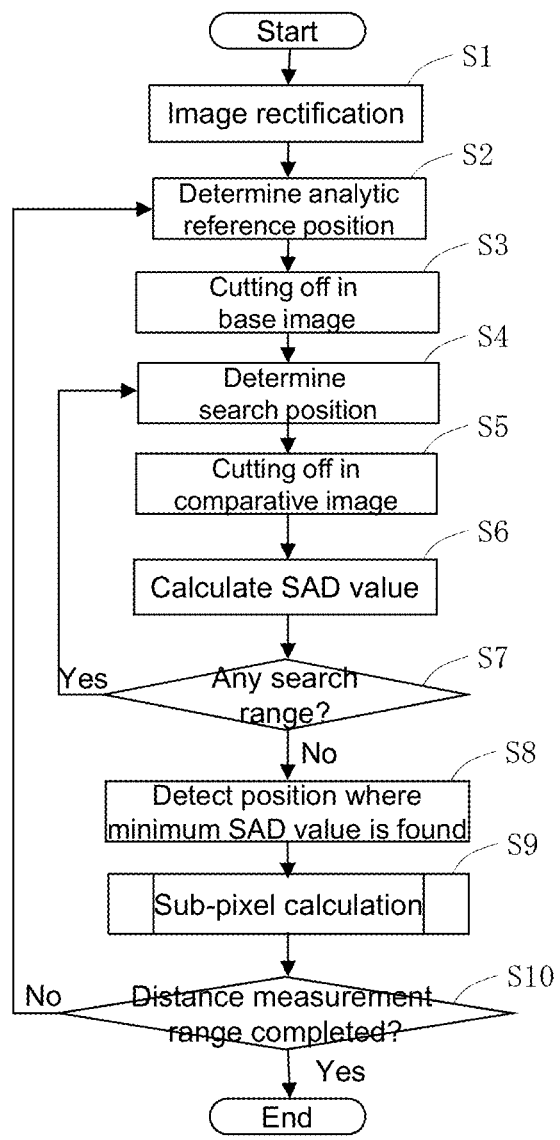
FIG. 7 is a flow chart for illustrating an operation of the stereo image processor according to the embodiment.

FIG. 7 is a flow chart showing a flow of disparity calculation with the stereo image processor 1 in the embodiment. As shown in FIG. 7, when partial displacement between images caused by disparity is calculated from stereo images, image rectification is first performed on the input stereo images (a base image and a comparative image) (S1), and an analytic reference position (xa,xy) is determined for each image (S2). A rectangular window is used to perform cutting off in the base image (S3) and then a search position (or a shift amount of the rectangular window) in the comparative image is determined (S4). The rectangular window is then used to perform cutting off in the comparative image (S5) and an SAD value at the search position is calculated (S6). The search position in the comparative image is horizontally shifted on a per pixel basis, and when the calculation of SAD values is completed through the search range (S7), a position (pixel-precision partial displacement n between images) where the minimum SAD value is found among the SAD values is determined (S8). Then, at a position n matched in the pixel level matching, sub-pixel level matching calculation is performed (S9). These processes (S2 to S9) are repeated for the entire distance measurement range until the disparity calculation is completed (S10).

Figure 8:
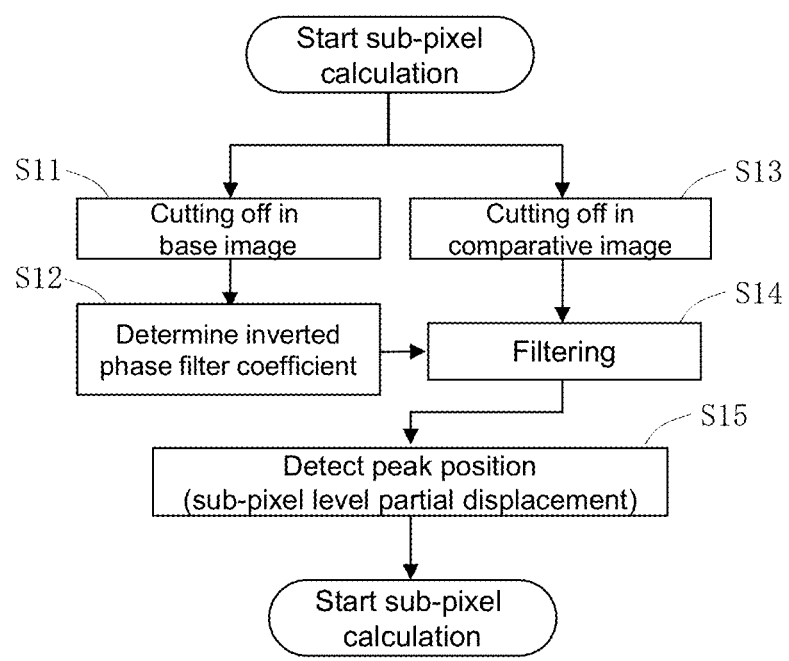
FIG. 8 is a flow chart for illustrating a flow of sub-pixel calculation (i.e. detecting a peak position using inverted phase filter) according to the embodiment.

FIG. 8 is a flow chart showing a flow of sub-pixel level matching calculation (sub-pixel calculation). As shown in FIG. 8, once the sub-pixel calculation is started, a window function of a Hanning window is used to perform cutting off in the base image (S11), and a value f'(-k) obtained by luminance values of the base image with the order thereof reversed is used as a filter coefficient for the inverted phase filter (S12). The window function of the Hanning window is then used to perform cutting off in the comparative image (S13) and filtering is performed with the inverted phase filter (S14). A peak position is thereafter detected from an output value of the filtering with the inverted phase filter, and sub-pixel level partial displacement δ between the base image and the comparative image is determined (S15).

According to the stereo image processor 1 according to the embodiment, the inverted phase filter section 9 is provided, which performs filtering with an inverted phase filter given the partial images of the same object that have minimum pixel-precision partial displacement. The accuracy of disparity calculation and analytical resolution can therefore be improved, and fast processing is possible because less computation is required in the disparity calculation.

In other words, a stereo image processor 1 according to the present invention is a stereo image processor 1 that calculates partial displacement between images caused by disparity based on a base image and a comparative image obtained by taking images of the same object, the processor comprising: a first matching section 6 for performing image matching on partial images of the same object included in a base image and a comparative image respectively and detecting pixel-precision partial displacement between the base image and the comparative image based on a result of the image matching; an inverted phase filter processing section 9 for filtering pixel values from the comparative image with an inverted phase filter using, as a filter coefficient, pixel values from the base image with the order thereof reversed, given the partial images of the same object that have minimum pixel-precision partial displacement; and a peak position detecting section 10 for detecting a peak position where an output value of the filtering with the inverted phase filter is maximum and detecting sub-pixel-precision partial displacement between the base image and the comparative image based on the peak position.

With this configuration, pixel-precision partial displacement between the base image and the comparative image is detected by image matching, and given the partial images that have minimum pixel-precision partial displacement, filtering is performed with an inverted phase filter. A peak position is detected based on the result of the filtering and sub-pixel-precision partial displacement between the base image and the comparative image is calculated. The accuracy of disparity calculation and analytical resolution can therefore be improved. In this case, the image matching for detecting pixel-precision partial displacement requires less computation, and the filtering using an inverted phase filtering also requires less computation because only inverted phase filter calculation may be needed to perform on partial images that have minimum pixel-precision partial displacement without the need of FFT and inverse FFT calculation. Therefore, fast disparity calculation may be possible.

In addition, in the stereo image processor 1 according to the present invention, the peak detecting section 10 is configured to detect a peak position using a sinc function.

With this configuration, a peak position can be detected using a sinc function and sub-pixel-precision partial displacement between the base image and the comparative image can be calculated. In the process of detecting a peak position using a sinc function, since it is only necessary to use binary search to perform calculation only for a required sub-pixel accuracy, computation may be optimized to a necessary and sufficient level and fast disparity calculation may be possible. In this case, the sampling theorem can be used to facilitate determination of a peak position with a high accuracy.

In addition, in the stereo image processor 1 according to the present invention, the peak detecting section 10 is configured to detect a peak position using quadratic curve approximation.

With this configuration, a peak position can be detected using quadratic curve approximation and sub-pixel-precision partial displacement between the base image and the comparative image can be calculated. Since the process of detecting a peak position using quadratic curve approximation requires much less computation, faster disparity calculation may be possible.

The stereo image processor 1 according to the present invention also comprises a matching error detecting section 11 for detecting a matching error in image matching based on the result of filtering with the inverted phase filter.

With this configuration, a matching error in image matching can be detected based on the result of filtering with the inverted phase filter. For example, when an output of the filtering with the inverted phase filter is not in bilateral symmetry, it is determined that the pixel level matching has been erroneous matching, which is detected as a matching error.

In addition, in the stereo image processor 1 according to the present invention, the inverted phase filter section 9 is configured to determine the tap length of the inverted phase filter depending on the magnitude of pixel-precision partial displacement detected in image matching.

With this configuration, the tap length of the inverted phase filter (a length, K-J, of the window function w(m) used to cut off a partial image in filtering with the inverted phase filter) is set appropriately depending on the magnitude of pixel-precision partial displacement detected in image matching. For example, since a distant object is printed as a small image, the pixel-precision partial displacement is smaller and the tap length of the inverted phase filter (the length of the window function) is also set smaller accordingly.

Embodiments according to the present invention have been described by way of illustration. The scope of the invention, however, is not limited thereto and alteration and modification can be made thereto without departing based on the scope of the invention as defined by the appended claims.

For example, although description has been made here as an example to the case of calculation with the inverted phase filter in sub-pixel level matching, the scope of the invention is not limited thereto. For example, as a further embodiment, cross-correlation may be used for calculation in sub-pixel level matching.

Embodiment 2

Figure 9:
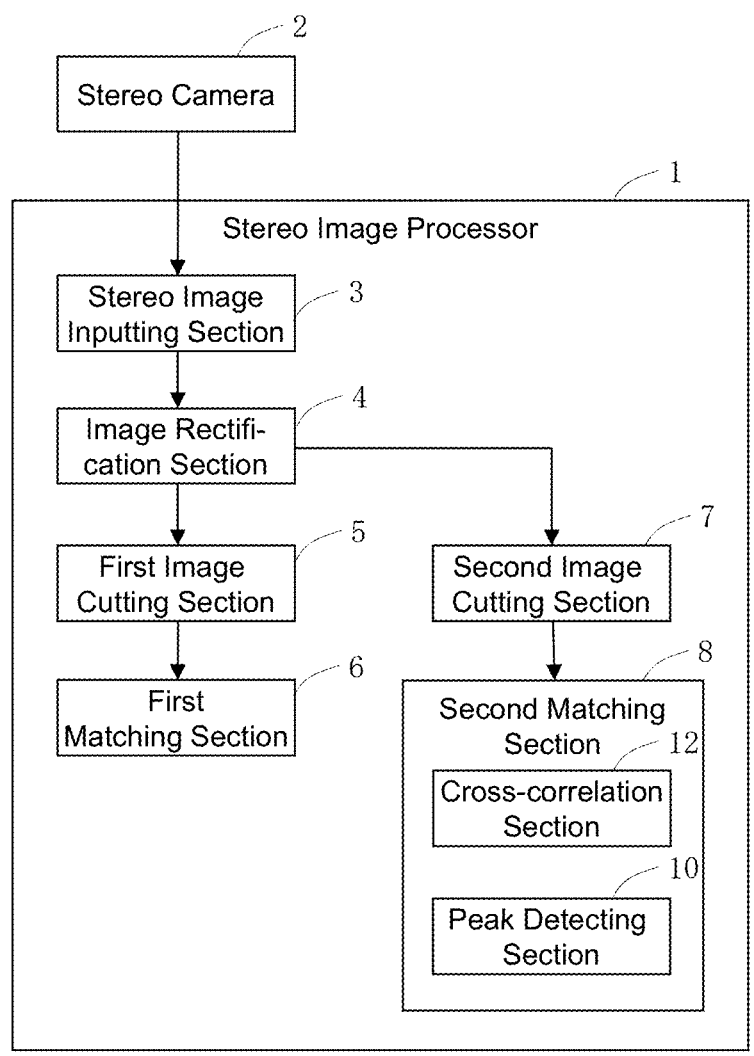
FIG. 9 is a block diagram for illustrating a configuration of a stereo image processor according to a further embodiment.

FIG. 9 is a block diagram for illustrating a configuration of a stereo image processor 1 according to a further embodiment. As shown in FIG. 9, a second matching section 8 according to the embodiment is provided with a cross-correlation section 12, instead of the inverted phase filter section 9. The cross-correlation section 12 has a function of calculating a value of cross-correlation, given partial images at positions matched in the pixel level matching. The cross-correlation section 12, therefore, corresponds to "cross-correlation calculating means" of the invention.

Figure 10:
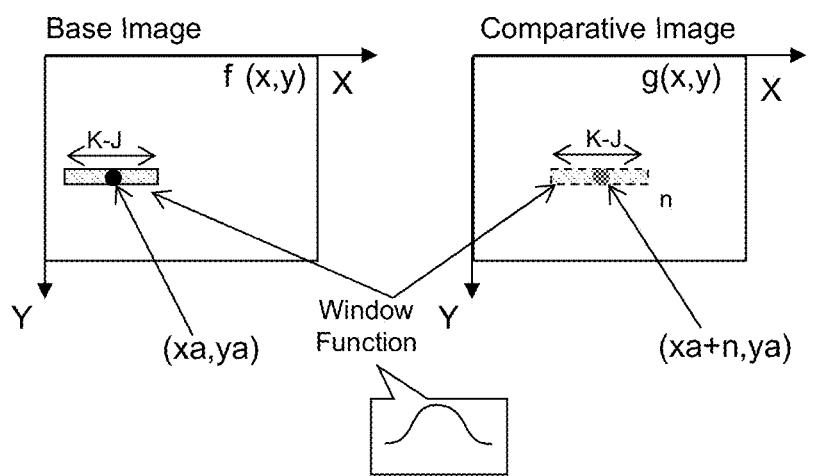
FIG. 10 is a diagram for illustrating a process of calculating a cross-correlation value.
Figure 10:

FIG. 10 is a diagram for illustrating a process of calculating a value of cross-correlation. In this case, as shown in FIG. 10, a window function w(m) of a Hanning window as shown in the expression (2) is used to cut off data from a base image with a predetermined position (xa,ya) centered, and cut off data from a comparative image with a position (xa+n,ya) centered, which has been matched in pixel level matching. In this cross-correlation section 12, the following expression (6) is used to calculate a value of cross-correlation between the cut template and comparative images:

[Expression 6]

$$CC(n) = \sum_{j=ya-wv/2}^{ya+wv/2} \sum_{i=xa-wh/2}^{xa+wh/2} \{f'(x+i, y+j) \times g'(x+i+n, y+j)\} \quad (6)$$

In the expression (6), when i is replaced with −k, then the expression within Σ is equivalent to the expression (3), and the range of addition of Σ is defined as −J to −K. The characters J and K indicate the range of the window function with 0 in the center and have opposite signs, which essentially means that only the order of addition is mathematically different from each other and a similar output to the expression (3) can be obtained. This means that calculation with the inverted phase filter can be replaced with cross-correlation calculation. Even with cross-correlation, therefore, sub-pixel level matching as accurate as the method with an inverted phase filter is possible.

There has conventionally been an approach that uses cross-correlation to accomplish image matching and sub-pixel estimation. The present invention, however, is totally different since cut-off positions are determined at a pixel level and only such cut data is used to calculate cross-correlation.

According to the stereo image processor 1 according to the further embodiment, a cross-correlation section 12 is provided, which calculates a value of cross-correlation given the partial images of the same object that have minimum pixel-precision partial displacement. The accuracy of disparity calculation and analytical resolution can therefore be improved, and fast processing is possible because less computation is required in the disparity calculation.

In other words, a stereo image processor 1 according to the present invention is a stereo image processor 1 that calculates partial displacement between images caused by disparity based on a base image and a comparative image obtained by taking images of the same object, the processor comprising: a first matching section 6 for performing image matching on partial images of the same object included in a base image and a comparative image respectively and detecting pixel-precision partial displacement between the base image and the comparative image based on a result of the image matching; a cross-correlation section 12 for calculating a cross-correlation value between the base image and the comparative image for partial images of the same object that have minimum pixel-precision partial displacement; and a peak detecting section 10 for detecting a peak position where the cross-correlation value is maximum and detecting sub-pixel-precision partial displacement between the base image and the comparative image based on the peak position.

With this configuration, pixel-precision partial displacement between the base image and the comparative image is detected by image matching, and given the partial images that have minimum pixel-precision partial displacement, a value of cross-correlation is calculated. A peak position is detected from the value of cross-correlation and sub-pixel-precision partial displacement between the base image and the comparative image is calculated. The accuracy of disparity calculation and analytical resolution can therefore be improved. In this case, the image matching for detecting pixel-precision partial displacement requires less computation, and the process of calculating a value of cross-correlation also requires less computation because partial images that have minimum pixel-precision partial displacement may only be used to perform the filtering. Therefore, fast disparity calculation may be possible.

Figure 11:
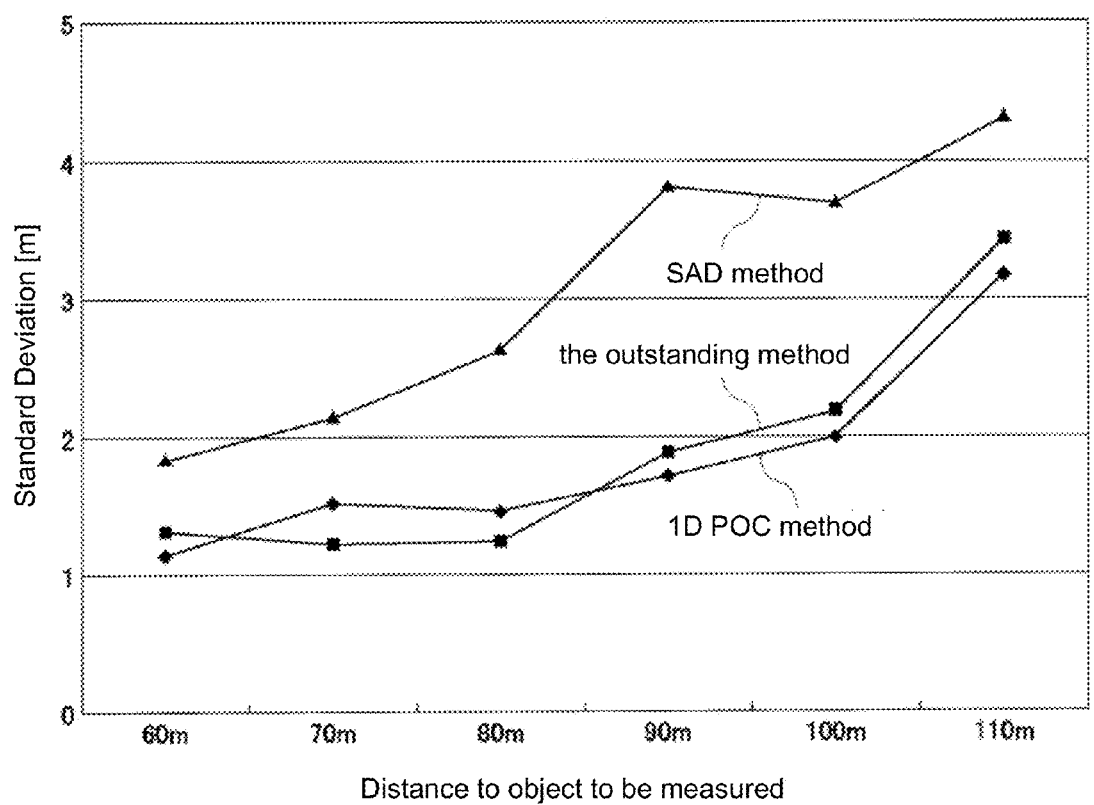
FIG. 11 is a graphical representation of a comparison result of distance measurement accuracy.

FIG. 11 shows a comparison result of distance measurement accuracy between the cases of an SAD method, a 1D POC method, and a stereo image processing method according to the present invention (hereinafter referred to as "the method"). The distance measurement accuracy is shown as a relationship between the distance to the object to be measured and the standard deviation of the distance measurement results.

The result shown in FIG. 11 has been based on a vehicle being the object to be measured and calculated based on stereo images taken by varying distances from the stereo camera by 10 m interval. As a performance index, the standard deviation of the distance measurement results is used in order to remove error factors due to lens distortion correction or image rectification of the stereo camera. In FIG. 11, a method that shows a smaller standard deviation of the distance measurement results is a method with a higher accuracy. The standard deviation here indicates a variation of the distance measurement results.

The standard deviation of the distance measurement results is calculated using as a sampling point a pixel in a vehicle area visually extracted among pixels included in the taken stereo images. Quadratic curve approximation that requires the least computation is used for the sub-pixel estimation in the method. As shown in FIG. 11, the POC method (indicated by ◇) and the method (indicated by □) show a similar characteristics and smaller standard deviations than the SAD method (indicated by Δ).

FIG. 12 shows a comparison result of computational time in disparity calculation between the cases of an SAD method, a 1D POC method, and the method.

The result shown in FIG. 12 is a time duration required for calculation for 1 frame of a half VGA image (640×240) with a personal computer (33.33 GHz). Although the method requires a computational time 1.25 times longer than the SAD method, the 1D POC method still requires a computational time at least 30 times longer than the method.

As described above and as apparent from the results shown in FIG. 11 and FIG. 12, the stereo image processing method according to the present invention has an advantage that it only requires a similar computational time to the SAD method and provides a similar level of distance measurement accuracy to the 1D POC method.

Embodiment 3

Figure 13:
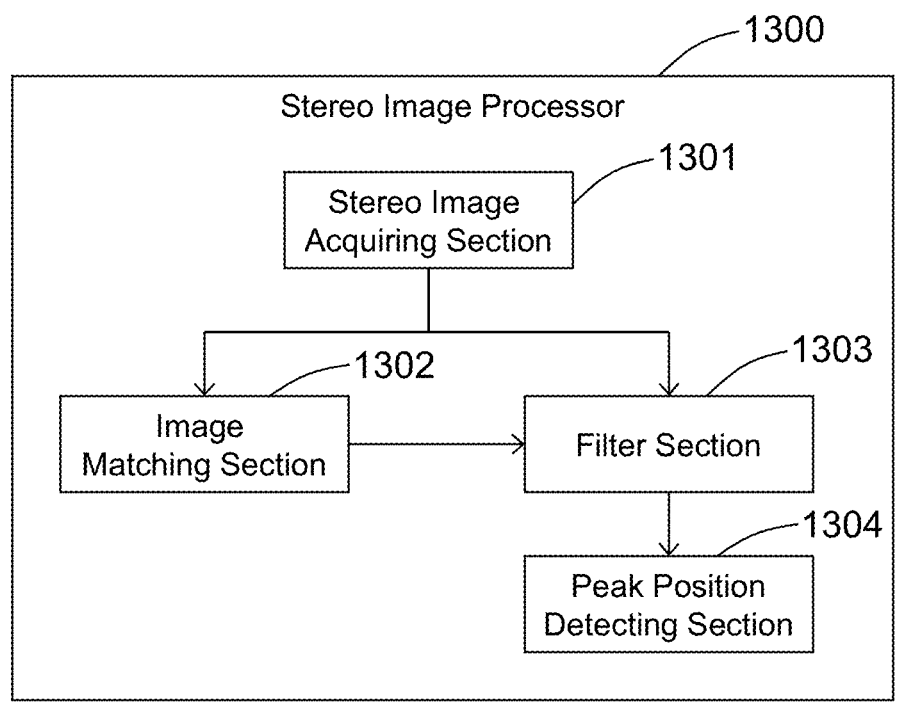
FIG. 13 is a block diagram for illustrating a configuration of a stereo image processor according to a further embodiment.

FIG. 13 shows a configuration of a stereo image processor 1300 according to Embodiment 3 of the invention. The stereo image processor 1300 is composed of a stereo image acquiring section 1301, an image matching section 1302, a filter section 1303, and a peak position detecting section 1304.

Here, the stereo image acquiring section 1301 corresponds to the stereo camera 2 and the stereo image inputting section 3 in FIG. 1, the image matching section 1302 corresponds to the first image cutting section 5 and the first matching section 6 in FIG. 1, the filter section 1303 corresponds to the second image cutting section 7 and the inverted phase filter section 9 in FIG. 1, and the peak detecting section 1304 corresponds to the peak detecting section 10 in FIG. 1.

Description will now be made to functions of the stereo image processor 1300 according to Embodiment 3 with reference to FIG. 13. In the description below, it is assumed that an image described below has the X axis in the horizontal direction of the image and the Y axis in the vertical direction of the image, and one pixel corresponds to one coordinate point.

In the description below, although a predetermined reference point in a base image of stereo images is specifically described, the processing described below is performed on all vertical and horizontal pixels in the entire screen of the base image as a process performed by the stereo image processor 1300.

The stereo image acquiring section 1301 comprises two or more imaging systems, or cameras, and acquires the base image and the comparative image obtained by taking images of the same object by the cameras.

The image matching section 1302 performs image matching for the stereo images based on the base image and the comparative image obtained from the stereo image acquiring section 1301, and calculates "the amount of partial displacement n" along coordinate axes between the base image and the comparative image.

The amount of partial displacement n is hereinafter defined as pixel-precision partial displacement. The disparity between the base image and the comparative image, which the stereo image processor according to the present invention is intended to derive, is hereinafter defined as sub-pixel-precision partial displacement.

The filter section 1303 acquires the base image and the comparative image from the stereo image acquiring section 1301, and acquires "the amount of partial displacement n" from the image matching section 1302.

The filter section 1303 extracts a partial image from the base image acquired from the stereo image acquiring section 1301, and calculates a filter coefficient from the partial image resulting from the base image. The filter section 1303 also extracts a partial image from the comparative image acquired from the stereo image acquiring section 1301, and generates an input signal from the partial image resulting from the comparative image. The filter section 1303 generates an output signal based on the input signal and the filter coefficient.

The peak position detecting section 1304 detects a peak value from the output signal acquired from the filter section 1303. The peak value here refers to the maximum value in the output signal.

In the embodiment, although the lens distortion correction and the image rectification for optical axes are not applied to the stereo images acquired by the stereo image acquiring section 1301, they may be applied as in Embodiment 1.

Functions of each of the components will now be described in detail.

The stereo image acquiring section 1301 has two or more imaging systems. The stereo image acquiring section 1301 uses a first imaging system and a second imaging system to take images of an object so as to acquire a base image obtained by using the first imaging system to take the image of the object and a comparative image obtained by using the second imaging system to take the image of the object. Since the stereo image acquiring section 1301 is constructed based on well-known techniques, detailed description thereof will be omitted.

The image matching section 1302 performs image matching for the stereo images based on the base image and the comparative image obtained from the stereo image acquiring section 1301, and calculates "the amount of partial displacement n" between the base image and the comparative image.

Since process details are the same as those of the first image cutting section 5 and the first matching section 6 in Embodiment 1, description will be made with reference to FIG. 2.

FIG. 2 shows how a rectangular window of a predetermined window size (vertical size: wv pixels; and horizontal size: wh pixels) is used to cut off partial images from the base image and the comparative image. In the base image, a window function of a rectangular window centered at a predetermined reference point (xa,ya) is used to cut off a partial image from the base image. The extraction of the partial image cut off from the base image by means of a window function of a rectangular window is thus accomplished.

The predetermined reference point refers to reference coordinates. Further, although description has been made to a window function of a rectangular window centered at a predetermined reference point, the reference point may be around the center instead of the exact center.

On the other hand, in the comparative image, the image is shifted in a predefined searching range on a per pixel basis in the horizontal direction, or baseline direction, from the predetermined reference point (xa,ya) in the comparative image while data is cut off. The extraction of the partial image cut off from the comparative image by means of a window function of a rectangular window is thus accomplished.

Based on the expression (1) similar to Example 1, the image matching section 1302 calculates an SAD value, or a level of difference in pixel luminance between the partial image cut off from the base image by the window function of a rectangular window and the partial image cut off from the comparative image by the window function, and derives partial displacement "n" (in units of pixels) between the images at which the SAD value is minimized.

In the comparative image, a coordinate point (xa+n,ya) is hereinafter defined as a corresponding point.

In this way, the image matching section 1302 applies image matching for the stereo images to the partial image cut off from the base image by means of a window function of a rectangular window and the partial image cut off from the comparative image by means of the window function of a rectangular window, and derives pixel-precision partial displacement between the base image and the comparative image, that is, "the amount of partial displacement n" based on the result of the image matching.

Although description has been made here to the case where the SAD method is used for pixel level matching, the scope of the invention is not limited thereto. In other words, any other methods, such as the Sum of Squared Differences (SSD) method, may be used as long as they require less computation.

The filter section 1303 acquires the base image and the comparative image from the stereo image acquiring section 1301, and acquires information indicative of the image matching for the stereo images being accomplished based on the "amount of partial displacement n" and the predetermined reference point (xa,ya) from the image matching section 1302.

The filter section 1303 extracts the partial image from the base image acquired from the stereo image acquiring section 1301, and calculates a filter coefficient from the partial image resulting from the base image. The filter section 1303 also extracts the partial image from the comparative image acquired from the stereo image acquiring section 1301, and generates an input signal from the partial image resulting from the comparative image. The filter section 1303 generates an output signal based on the input signal and the filter coefficient.

Since process details are the same as those of the second image cutting section 7 and the inverted phase filter section 9 in Embodiment 1, description will be made with reference to FIG. 3.

FIG. 3 shows how a window function w(m) of a Hanning window represented by the expression (2) as shown in Example 1 is used to cut off partial images from the base image and the comparative image.

Although other window functions than a Hanning window may include Hamming, Blackman, Kaiser windows, and the like, the Hanning window is used in the description of the embodiment. The choice of the window function may depend on which parameter takes precedence among characteristics of partial images cut off from images, such as frequency power characteristics, phase characteristics, and continuity of cut edges (for example, the window function in FIG. 3 is changing more continuously than that in FIG. 2). The Kaiser window is suitable if the phase characteristics take precedence, yet calculation thereof is considerably complex. On the other hand, the Hanning window is suitable in view of computation reduction.

In this embodiment, it is important that less computation is required because the window function (hereinafter referred to as a first window function) used in the image matching section 1302 is used in search processes that are computationally demanding, while required accuracy may only be at a pixel level; a rectangular window that may be obtained simply by cutting off data is therefore used in the description.

On the other hand, for the window function (hereinafter referred to as a second window function) used in the filter section 1303, it is important that a partial image cut off from an image should not include noises induced when the partial image is cut off by the window function, in order to accurately determine sub-pixels.

Therefore, for the second window function, since lesser cut noises take precedence, it is desirable to use a window function that provides more continuous change in opposite edges than the first window function, that is, a window function that provides opposite edges of one cycle at substantially zero. In this way, continuity of a signal after cutting may be maintained in the cut edge portions so as to remove, from inverted phase filter characteristics, noise components caused by cutting.

Comparing frequency characteristics of the first window function and the second window function, the width of the main lobe of the first window function is smaller and the amplitude of the side lobe is larger than those of the second window function.

In FIG. 3, the window function w(m) of a Hanning window used to cut off the window function of a Hanning window has a vertical axis of 1 pixel and a horizontal axis of K-J pixels, where "m" is an integer equal to or larger than the coordinate point "J" and equal to or smaller than the coordinate point "K".

In addition, in FIG. 3, g'(m)(where "m" is an integer equal to or larger than "J" and equal to or smaller than "K") indicates a luminance value of a partial image cut off from the comparative image by means of the window function of a Hanning window.

In the base image in FIG. 3, the window function of a Hanning window centered at a predetermined reference point (xa,ya) is used to cut off a partial image from the base image. This means that the partial image cut off from the base image by means of the window function of a Hanning window has a vertical axis size of 1 pixel and a horizontal axis size of K-J pixels around the coordinates (xa,ya).

On the other hand, in the comparative image in FIG. 3, the window function of a Hanning window centered at a point (xa+n,ya) is used to cut off a partial image, while the point (xa+n,ya) is a point where corresponds to the most effective evaluation value, such as a SAD value, indicative of a level of pixel level matching in image matching of stereo images in the image matching section 1302.

This means that the partial image cut off from the comparative image by means of the window function of a Hanning window has a vertical axis size of 1 pixel and a horizontal axis size of K-J pixels around the coordinates (xa+n,ya).

Although description has been made here as an example to the case of the window size of "vertical size: 1 pixel; and horizontal size: K-J pixels", the scope of the invention is not limited thereto.

For example, if the vertical size is 3 pixels, then the above processing may be performed on a per vertical pixel basis and results from 3 vertical pixels may be averaged.

Further, for example, if the vertical size includes two or more pixels, then the above processing may be performed on a per vertical pixel basis and results from every pixels included in the vertical size may be weighted and averaged. In this case, the weighting coefficient may be determined depending on the window function as in 2D POC.

Further, although description has been made to the case of a window function of a Hanning window, any other window functions may be used.

In the filter section 1303, a value is obtained by reversing a sequence of luminance values of the respective coordinate points in the partial image cut off from the base image by means of the window function of a Hanning window, and the value is used as a filter coefficient to derive an inverted phase filter. The filter section 1303 then uses the inverted phase filter to filter the luminance values of the respective coordinate points in the partial image cut off from the comparative image by means of the window function of a Hanning window.

FIG. 4 is a diagram for illustrating an example of the filtering with the inverted phase filter. Filtering performed in the filter section 1303 will now be described below with reference to FIG. 4.

FIG. 4 shows how filtering is performed on an input signal x(m), which is a sequence of luminance values in the partial image cut off from the comparative image by means of the window function of a Hanning window. In the description here, it is assumed that a length K-J in the baseline direction of the window function w(m) of a Hanning window in FIG. 3 is "5" pixels for example, and an input signal x(m) is "1, 2, 3, 4, 5" for example.

In this case, each numeral in the input signal x(m) represents luminance at each coordinate point, and luminance at other coordinate points outside the partial image is considered as zero. In addition, if the sequence of the input signal x(m) is "1, 2, 3, 4, 5" and the partial images cut off from the base image and the comparative image are not displaced at a sub-pixel level, the sequence of luminance values in the partial image cut off from the base image by means of the window function of a Hanning window is "1, 2, 3, 4, 5" as well, because image matching has been accomplished in the image matching section 1302.

If the length in the baseline direction of the window function w(m) of a Hanning window in FIG. 3 is "5" pixels, then the tap length of the inverted phase filter h(k) is also "5" because it matches with the number of pixels of the partial image cut off from the base image by means of the window function. In other words, the tap length of the inverted phase filter is the same as the window length of the window function.

Since the size of the partial image cut off from the base image and the size of the partial image cut off from the comparative image are equal to each other, the number of data in the input signal x(m) and the tap length of the inverted phase filter h(k) are also equal.

The filter coefficient of the inverted phase filter is a sequence of "5, 4, 3, 2, 1" obtained from the sequence "1, 2, 3, 4, 5" of luminance values in the partial image cut off from the base image by means of the window function of a Hanning window with the order thereof reversed.

The filter section 1303 uses the inverted phase filter "5, 4, 3, 2, 1" to filter the input signal "1, 2, 3, 4, 5" results from the comparative image. The filtering will now be described in detail.

In filtering, when "k" is assigned for each coordinate point of the input signal "1, 2, 3, 4, 5", the inverted phase filter is applied to 5 pieces of data "k−2, k−1, k, k+1, k+2" in the horizontal direction around a coordinate point "k" and the total sum thereof is calculated as an output signal z(m)(where m is a numeral from 1 to 5).

If luminance of any coordinate point outside the partial image is zero, then the luminance values around the input signal x(m) is "0, 0, 1, 2, 3, 4, 5, 0, 0" in consideration of the luminance of the coordinate points outside the partial area. Assuming that "t" in FIG. 4 (t: 0-4) is a coordinate point in the partial image cut off from the comparative image by the Hanning window, the result of the filtering is as described below.

When t=0, five luminance values in the horizontal direction around t=0, i.e. 0, 0, 1, 2, 3, in the comparative image are filtered with the inverted phase filter "5, 4, 3, 2, 1" and an output value "26" (=0×1+0×2+1×3+2×4+3×5) is calculated.

When t=1, five luminance values in the horizontal direction around t=1, i.e. 0, 1, 2, 3, 4, in the comparative image are filtered with the inverted phase filter "5, 4, 3, 2, 1" and an output value "40" (=0×1+1×2+2×3+3×4+4×5) is calculated.

Similarly, when t=2, t=3, and t=4, output values "55", "40", and "26" are calculated, respectively.

Therefore, a signal sequence of "26, 40, 55, 40, 26" is output as the output signal z(m).

In this way, filtering with the inverted phase filter is characterized by its output signal that is symmetrical (in FIG. 4, bilateral symmetry with respect to t=2) and has a peak in the center. In addition, the inverted phase filter is a type of so-called FIR filter, and is, therefore, characterized by being a linear shift-invariant system. The linear shift-invariant system as used here is a system in which an input signal with any shift leads to an output signal with the same amount of shift as the input signal.

This means that although description has been made to the case where the partial images cut off from the base image and the comparative image are not displaced at a sub-pixel level, even an input signal x(m) with a shift interval smaller than the sampling interval leads to an output with the same amount of shift as the input, and the output will have a value taken at a sampling point in the shifted signal.

In the filter section 1303, a value f'(−k) obtained by luminance values in the partial image cut off from the base image with the order thereof reversed is used as the filter coefficient h(k) for the inverted phase filter, and a luminance value g'(m) in the partial image cut off from the comparative image is the input signal x(m). Therefore, it follows that an output signal z(m) calculated in the filter section 1303 can be calculated by the expression (3) similar to Example 1.

In the filter section 1303, the tap length of the inverted phase filter is set depending on the magnitude of pixel-precision partial displacement n detected in the pixel level matching. For example, if the pixel-precision partial displacement n is smaller, the tap length of the inverted phase filter also becomes smaller accordingly.

Therefore, when disparity is to be determined for an object seen as the same size in the real space, a distant object causes lesser disparity than a close object and accordingly lesser pixel-precision partial displacement "n". Since the size of the object in an image is also reduced, the size of a partial image may be adaptively changed with respect to "n" so as to adaptively change the tap length of the inverted phase filter. In this way, adaptive processing, that is, disparity calculation tailored to the size of an object may be possible; in other words, partial images of an object seen at the same distant may only be used to calculate disparity.

Since the output from the filter section 1303 is a linear shift-invariant system output, the output may theoretically reflect a true shift, excepting an error in the lens distortion correction, an error such as a gain noise caused by an image sensor such as CCD, and an error in computational accuracy for cutting off an image by using a window. Therefore, it is possible to determine a true peak position at a sub-pixel level by interpolating numerical values between pixels for inverted phase filter outputs discretely separated on a per pixel basis according to a sampling theorem.

The filter section 1303 has been described.

The peak detecting section 1304 peak position detecting section 1304 detects a peak value from an output signal acquired from the filter section 1303.

Since process details are the same as those of the peak detecting section 10 in Embodiment 1, description will be made with reference to FIG. 5.

The peak detecting section 1304 uses a sinc function to detect a peak position at which an output value from the filter section 1303 is maximized at a sub-pixel level.

The sinc function is a function defined by $\sin(\pi x)/\pi x$, and is used to restore discrete sampling data to an original continuous data. It has been demonstrated in the sampling theorem that convolution between sampled discrete data and the sinc function can completely restore the original continuous data.

Therefore, it is theoretically possible to derive a true peak position even at a sub-pixel level by interpolating data between pixels for discrete inverted phase filter outputs using the sinc function to determine the peak position.

FIG. 5 is a diagram for illustrating an example of detecting a peak position using a sinc function. As shown in FIG. 5, when the sinc function is used to detect a peak position, the binary search is used to detect the peak position.

For example, a position A is defined first, which is a position m=0 where an output value z(m) output from the filter section 1303 is maximum. Next, comparison is made between output values z(+1) and z(−1) of positions shifted by one pixel from the maximum position A to right and left, respectively, and a position m=1, whichever larger, is defined as B.

A intermediate position between the positions A and B is then defined as C, and the expression (4) similar to Example 1 that uses the sinc function is used to calculate the value of the position C according to the sampling theorem. The position C is then treated as a new position B, and the above process is repeated as dictated by a required accuracy to find a peak position δ at which the largest value is provided.

Specifically, the above process may be performed only once if the required sub-pixel accuracy is ½ pixels, and the number of repetition may be determined depending on the required sub-pixel accuracy, such as two times for a ¼-pixel accuracy and three times for a ⅛-pixel accuracy.

Although description has been made to an approach that uses the binary search as an example of an approach for deriving a peak position using the sinc function, other approaches such as gradient method may be used to search the peak position; thus the scope of the invention is not limited thereto and any other method may be used as long as the sinc function is used to detect a peak position by interpolating values between pixels.

Furthermore, the peak detecting section 1304 may use quadratic curve approximation to detect a peak position where an output value from the filter section 1303 is maximum so as to reduce computation. Peak position extraction using quadratic curve approximation is a method in which, when a peak position of discrete 1D data is to be determined with an accuracy below the discrete interval, a quadratic curve is fitted and the peak position is calculated based on the position of the maximum value with an accuracy smaller than the discrete interval.

FIG. 6 is a diagram for illustrating an example of detecting a peak position using quadratic curve approximation. In this case, as shown in FIG. 6, the maximum value of a quadratic curve passing through the following three points is defined as δ: the maximum value of an output value from the filter section 1303 and output values z(+1) and z(−1) on the right and left of the maximum value. In this case, the peak position δ is calculated by the expression (5) similar to Example 1.

As described above, the peak detecting section 1304 has a function of detecting a peak position where an output value of the filtering with the inverted phase filter is maximum and detecting sub-pixel-precision partial displacement between the base image and the comparative image based on the peak position.

As described above, according to the stereo image processor 1300 according to the embodiment, since filtering with an inverted phase filter is performed given partial images of the same object that have minimum pixel-precision partial displacement, the accuracy of disparity calculation and analytical resolution can be improved, and fast processing can be achieved because less computation is required in the disparity calculation.

With this configuration, pixel-precision partial displacement between the base image and the comparative image is detected by image matching, and given the partial images that have minimum pixel-precision partial displacement, filtering is performed with an inverted phase filter. A peak position is detected based on the result of the filtering and sub-pixel-precision partial displacement between the base image and the comparative image is calculated. The accuracy of disparity calculation and analytical resolution can therefore be improved. In this case, the image matching for detecting pixel-precision partial displacement requires less computation, and the filtering using an inverted phase filtering also requires less computation because only inverted phase filter calculation may be needed to perform on partial images that have minimum pixel-precision partial displacement without the need of FFT and inverse FFT calculation. Therefore, fast disparity calculation may be possible.

Embodiments according to the present invention have been described by way of illustration. The scope of the invention, however, is not limited thereto and alteration and modification can be made thereto without departing based on the scope of the invention as defined by the appended claims.

Although currently possible preferred embodiments of the invention have been described above, it is understood that various modifications can be made to the embodiments and it is intended that all such modifications that fall within the true spirit and scope of the invention are covered by the attached claims.

INDUSTRIAL APPLICABILITY

As described above, a stereo image processor according to the present invention has advantages that the accuracy of disparity calculation and analytical resolution can be improved, and fast processing is possible because less computation is required in the disparity calculation, and the present invention is useful for use in devices such as one that measures a distance to a vehicle in front by using an on-board camera or one that estimates the direction of the driver's face by using an inboard camera.

REFERENCE SIGNS LIST

1 Stereo image processor
2 Stereo camera
3 Stereo image inputting section
4 Image rectification section
5 First image cutting section
6 First matching section
7 Second image cutting section
8 Second matching section
9 Inverted phase filter section
10 Peak detecting section
11 Matching error detecting section
12 Cross-correlation section

The invention claimed is:

1. A stereo image processor, comprising:
a stereo image acquiring section including a first imaging system and a second imaging system, the stereo image acquiring section for acquiring a base image by taking an image of an object by the first imaging system and a comparative image by taking an image of the object by the second imaging system;
an image matching section acquiring the base image and the comparative image from the stereo images, extracting a first partial image centered at a predetermined reference point from the base image with a first window function, and deriving a corresponding point from a predefined area in the comparative image, the corresponding point being a center point in a second partial image where a level of difference in image luminance is minimum relative to the first partial image;
a filter section acquiring the base image and the comparative image from the stereo images, extracting a third partial image centered at a predetermined reference point from the base image with a second window function, extracting a fourth partial image centered at the corresponding point from the comparative image, and generating an output signal sequence based both on values of a sequence of luminance values of respective coordinate points included in the third partial image with an order thereof reversed with respect to coordinates and on luminance values of respective coordinate points included in the fourth partial image; and
a peak position detecting section for detecting an output signal with a maximum output value from the acquired output signal sequence to determine disparity between the base image and the comparative image based on a position of the detected output signal in the output signal sequence.

2. The stereo image processor according to claim 1, wherein the second window function is a window function that provides more continuous change in opposite edges of one cycle than the first window function.

3. The stereo image processor according to claim 1, wherein the filter section sums up values of a sequence of luminance values of respective coordinate points included in the third partial image with an order thereof reversed with respect to coordinates and luminance values of respective coordinate points included in the fourth partial image on a relative position basis of coordinates in the third partial image and the fourth partial image to generate an output signal sequence.

4. The stereo image processor according to claim 1, wherein the peak position detecting section uses a sinc function to detect the peak position.

5. The stereo image processor according to claim 1, wherein the peak position detecting section uses a quadratic curve approximation to detect the peak position.

6. The stereo image processor according to claim 1, further comprising a matching error detecting section acquiring an output signal sequence generated by the filter section, and based on a value of an input signal included in the output signal sequence, determining that a center point in the second partial image derived by the image matching section should not be adopted as the corresponding point.

7. The stereo image processor according to claim 1, wherein window length of the second window function is determined based on amount of partial displacement on a coordinate axis between the corresponding point derived by the image matching section and the reference point.

8. A stereo image processing method, comprising:
in a stereo image acquiring section including a first imaging system and a second imaging system, acquiring a base image by taking an image of an object by the first imaging system and a comparative image by taking an image of the object by the second imaging system;
in an image matching section, acquiring the base image and the comparative image from the stereo images, extracting a first partial image centered at a predetermined reference point from the base image with a first window function, and deriving a corresponding point from a predefined area in the comparative image, the corresponding point being a center point in a second partial image where a level of difference in image luminance is minimum relative to the first partial image;
in a filter section, acquiring the base image and the comparative image from the stereo images, extracting a third partial image centered at a predetermined reference point from the base image with a second window function, extracting a fourth partial image centered at the corresponding point from the comparative image, and generating an output signal sequence based both on values of a sequence of luminance values of respective coordinate points included in the third partial image with an order thereof reversed with respect to coordinates and on luminance values of respective coordinate points included in the fourth partial image; and
in a peak position detecting section, detecting an output signal with a maximum output value from the acquired output signal sequence to determine disparity between the base image and the comparative image based on a position of the detected output signal in the output signal sequence.

9. A stereo image processor that calculates partial displacement between images caused by disparity based on a base image and a comparative image obtained by taking images of same object, the processor comprising:
an image matching section for performing image matching on partial images of the same object included in a base image and a comparative image respectively and detecting pixel-precision partial displacement between the base image and the comparative image based on a result of the image matching;
a cross-correlation calculating section for calculating a cross-correlation value between the base image and the comparative image for partial images of the same object that have minimum pixel-precision partial displacement; and
a peak position detecting section for detecting a peak position where the cross-correlation value is maximum and detecting sub-pixel-precision partial displacement between the base image and the comparative image based on the peak position.

10. A stereo image processor that calculates partial displacement between images caused by disparity based on a base image f(x,y) and a comparative image g(x,y) obtained by taking images of same object, the processor comprising:
an image matching section for performing image matching on partial images f(x,y) and g(x,y) (where, xa−wh/2≤x≤xa+wh/2, ya−wv/2≤y≤ya+wv/2) of the same object included in a base image and a comparative image respectively and detecting pixel-precision partial displacement n between the base image and the comparative image in direction x, which is baseline direction, based on a result of the image matching;
a calculation section for calculating the following expression on 1D partial images f'(m)=f(xa+m,ya)×w(m) and g'(m)=g(xa+n+m,ya) (where, J m K) cut off by using a window function w(m) at a position where the pixel-precision partial displacement n is minimum:

[Expression 3]

$$z(m) = \sum_{k=J}^{K} f'(-k) \times g'(m-k); \quad (3)$$

and
a peak position detecting section for detecting a peak position where an output value z(m) of the calculation is maximum and detecting sub-pixel-precision partial displacement δ between the base image and the comparative image based on the peak position.

* * * * *